United States Patent
Fang et al.

(10) Patent No.: US 9,672,204 B2
(45) Date of Patent: Jun. 6, 2017

(54) SYSTEM AND METHOD TO ACQUIRE PARAPHRASES

(75) Inventors: Ji Fang, Mountain View, CA (US); Jason Kessler, Boulder, CO (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 313 days.

(21) Appl. No.: 12/789,953

(22) Filed: May 28, 2010

(65) Prior Publication Data

US 2011/0295591 A1 Dec. 1, 2011

(51) Int. Cl.
*G06F 17/00* (2006.01)
*G06F 17/27* (2006.01)
*G06F 17/28* (2006.01)

(52) U.S. Cl.
CPC ...... *G06F 17/2775* (2013.01); *G06F 17/2795* (2013.01); *G06F 17/2827* (2013.01)

(58) Field of Classification Search
CPC .... G06F 17/271; G06F 17/274; G06F 17/275; G06F 17/277; G06F 17/289; G06F 17/2715; G06F 17/2735; G06F 17/2755; G06F 17/2785; G06F 17/2795; G06F 17/2818; G06F 17/2827; G06F 17/2836; G06F 17/2863; G06F 17/2872; G06F 9/4448
USPC ...................................................... 704/1–10
See application file for complete search history.

(56) References Cited

U.S. PATENT DOCUMENTS

| | | | |
|---|---|---|---|
| 4,823,306 A * | 4/1989 | Barbic et al. | |
| 5,369,574 A * | 11/1994 | Masegi et al. | 704/9 |
| 5,528,491 A * | 6/1996 | Kuno et al. | 704/9 |
| 6,014,663 A * | 1/2000 | Rivette et al. | 707/690 |
| 6,263,335 B1 * | 7/2001 | Paik et al. | |
| 6,408,266 B1 * | 6/2002 | Oon | 704/1 |
| 6,658,377 B1 * | 12/2003 | Anward | G06F 17/271 704/9 |
| 6,871,174 B1 * | 3/2005 | Dolan et al. | 704/9 |
| 7,013,109 B2 * | 3/2006 | Siders | G06Q 30/02 434/118 |
| 7,054,827 B1 * | 5/2006 | Lautzenheiser et al. | 705/7.32 |
| 7,058,567 B2 * | 6/2006 | Ait-Mokhtar et al. | 704/9 |
| 7,337,124 B2 * | 2/2008 | Corral | 705/7.17 |
| 7,383,200 B1 * | 6/2008 | Walker et al. | 705/7.15 |
| 7,418,447 B2 * | 8/2008 | Caldwell et al. | 705/26.1 |
| 7,483,894 B2 * | 1/2009 | Cao | |
| 7,668,718 B2 * | 2/2010 | Kahn et al. | 704/270 |
| 7,930,169 B2 * | 4/2011 | Billerey-Mosier | 704/9 |
| 7,937,265 B1 * | 5/2011 | Pasca et al. | 704/9 |

(Continued)

OTHER PUBLICATIONS

Caroline Brun and Caroline Hagege, "Normalization and paraphrasing using symbolic methods" ACL: Second International workshop on Paraphrasing, Paraphrase Acquisition and Applications, Sapporo, Japan, Jul. 7-12, 2003.*

(Continued)

*Primary Examiner* — Fariba Sirjani

(74) *Attorney, Agent, or Firm* — Fay Sharpe LLP

(57) ABSTRACT

An automatic paraphrase acquisition technique is provided. A common theme of the various embodiments described herein resides in careful design of simple tasks that can elicit the necessary information for the automated process. These tasks are performed quickly and inexpensively. By gathering the results produced, paraphrases can be generated automatically using the method and/or system.

16 Claims, 4 Drawing Sheets

---

200

Please examine the sentence:

*On my recent trip to California, I dropped my camera and it broke into two parts.*

Option: A Negative opinion toward the feature Construction Quality.

Remove parts of the sentence that are not relevant to the opinion and put the result below. Do not rewrite the sentence; only remove words from it.

(56) References Cited

U.S. PATENT DOCUMENTS

| | | | | |
|---|---|---|---|---|
| 8,086,557 B2* | 12/2011 | Ait-Mokhtar et al. | | 706/62 |
| 8,122,425 B2* | 2/2012 | Corral | | 717/101 |
| 8,131,536 B2* | 3/2012 | Weischedel et al. | | 704/5 |
| 8,155,951 B2* | 4/2012 | Jamieson | | 704/10 |
| 8,185,377 B2* | 5/2012 | Zhou | | 704/9 |
| 8,209,278 B1* | 6/2012 | Straus | G06F 17/21 | 705/1.1 |
| 8,271,483 B2* | 9/2012 | Staddon et al. | | 707/730 |
| 8,325,189 B2* | 12/2012 | Matsumura | | 345/440 |
| 8,352,405 B2* | 1/2013 | Fang et al. | | 706/50 |
| 8,370,130 B2* | 2/2013 | Yun et al. | | 704/9 |
| 2002/0007267 A1* | 1/2002 | Batchilo et al. | | 704/9 |
| 2002/0116169 A1* | 8/2002 | Ait-Mokhtar et al. | | 704/1 |
| 2003/0220815 A1* | 11/2003 | Chang et al. | | 705/2 |
| 2004/0034520 A1* | 2/2004 | Langkilde-Geary et al. | | 704/1 |
| 2005/0108001 A1* | 5/2005 | Aarskog | | 704/10 |
| 2005/0125232 A1* | 6/2005 | Gadd | | 704/270.1 |
| 2005/0138556 A1* | 6/2005 | Brun et al. | | 715/536 |
| 2006/0106592 A1* | 5/2006 | Brockett et al. | | 704/1 |
| 2007/0162761 A1* | 7/2007 | Davis et al. | | 713/182 |
| 2007/0168430 A1* | 7/2007 | Brun et al. | | 709/206 |
| 2007/0179776 A1* | 8/2007 | Segond et al. | | 704/9 |
| 2008/0208849 A1* | 8/2008 | Conwell | | 707/5 |
| 2009/0077027 A1* | 3/2009 | King et al. | | 707/3 |
| 2009/0100049 A1* | 4/2009 | Cao | | 707/5 |
| 2009/0164584 A1* | 6/2009 | Szetu | G06F 17/30997 | 709/205 |
| 2009/0187467 A1* | 7/2009 | Fang et al. | | 705/10 |
| 2009/0204596 A1* | 8/2009 | Brun et al. | | 707/5 |
| 2009/0235280 A1* | 9/2009 | Tannier et al. | | 719/318 |
| 2009/0240652 A1* | 9/2009 | Su et al. | | 707/1 |
| 2009/0254531 A1* | 10/2009 | Walker et al. | | 707/4 |
| 2009/0306967 A1* | 12/2009 | Nicolov | G06Q 30/02 | 704/9 |
| 2009/0326915 A1* | 12/2009 | Takano et al. | | 704/4 |
| 2010/0076957 A1* | 3/2010 | Staddon et al. | | 707/722 |
| 2010/0153318 A1* | 6/2010 | Branavan et al. | | 706/12 |
| 2010/0153372 A1* | 6/2010 | Kim | G06F 17/30864 | 707/722 |
| 2010/0161314 A1* | 6/2010 | Karttunen et al. | | 704/9 |
| 2010/0211379 A1* | 8/2010 | Gorman et al. | | 704/9 |
| 2010/0235313 A1* | 9/2010 | Rea | G06F 17/30265 | 706/52 |
| 2010/0268776 A1* | 10/2010 | Gerke | G06Q 10/10 | 709/204 |
| 2011/0093417 A1* | 4/2011 | Nigam et al. | | 706/12 |
| 2011/0099052 A1* | 4/2011 | Brun et al. | | 705/7.38 |
| 2011/0295591 A1* | 12/2011 | Fang et al. | | 704/9 |
| 2011/0320019 A1* | 12/2011 | Lanciani | G06Q 30/02 | 700/92 |
| 2012/0173644 A1* | 7/2012 | Brown et al. | | 709/206 |
| 2012/0259620 A1* | 10/2012 | Vratskides et al. | | 704/9 |
| 2012/0271788 A1* | 10/2012 | Fang et al. | | 706/50 |
| 2015/0331876 A1* | 11/2015 | Ambwani | G06F 17/30796 | 707/770 |
| 2016/0217297 A1* | 7/2016 | Seshasai | G06F 21/6218 | |

OTHER PUBLICATIONS

Chris Brockett et al. "Support Vector Machines for Paraphrase Identification and Corpus Construction," Third International Workshop on Paraphrasing (IWP2005), Asia Federation of Natural Language Processing, pp. 1-8, 2005.

John Burger et al., "Generating an Entailment Corpus from News Headlines," Proceedings of the ACL Workshop on Empirical Modeling of Semantic Equivalence and Entailment, Ann Arbor, Michigan, pp. 49-54, 2005.

Bill Dolan et al., "Unsupervised Construction of Large Paraphrase Corpora: Exploiting Massively Parallel News Sources," Proceedings of COLING 2004, Geneva, Switzerland, (Aug. 2004).

John Blitzer et al., "Biographies, Bollywood, Boom-boxes and Blenders: Domain Adaptation for Sentiment Classification," In Proceedings of the Association for Computational Linguistics (ACL), pp. 440-447, Jun. 2007.

* cited by examiner

| FEATURE NAME | NOT INVOKED | POSITIVE | NEGATIVE | NEUTRAL |
|---|---|---|---|---|
| CONSTRUCTION QUALITY | ○ | ○ | ⊙ | ○ |
| PICTURE QUALITY | ⊙ | ○ | ○ | ○ |
| BATTERY LIFE | ⊙ | ○ | ○ | ○ |

*FIG. 1*

SYSTEM AND METHOD TO ACQUIRE PARAPHRASES

BACKGROUND

The ability to recognize many different ways of expressing the same or similar meaning is important to many Natural Language Processing (NLP) applications, such as question answering, searching, etc. Paraphrase acquisition is the process used to address this issue. However, the current technology and approaches implementing paraphrase acquisition are inefficient and/or inadequate.

In this regard, paraphrase corpora are typically obtained either through manual annotations or through machine learning. Manual annotation of paraphrases is typically expensive and time consuming, while machine learned paraphrases are often error prone.

BRIEF DESCRIPTION

In one aspect of the presently described embodiments, the method comprises receiving raw text as input, sentence breaking the raw text into individual sentences, providing the individual sentences and a corresponding survey to an annotating source, wherein the annotating source conducts the survey based on the individual sentences, receiving results of the survey from the annotating source, filtering the survey results, providing the filtered survey results and a second survey to the annotating source, wherein the annotating source conducts the second survey based on the filtered results, receiving results of the second survey from the annotating source, and generating paraphrases based on the results of the second survey.

In another aspect of the presently described embodiments, the raw text is provided by a database.

In another aspect of the presently described embodiments, the providing the individual sentences and a survey is based on a computing script.

In another aspect of the presently described embodiments, the filtering is based on a computing script.

In another aspect of the presently described embodiments, the providing the filtered survey results and the second survey is based on a computing script.

In another aspect of the presently described embodiments, the generating paraphrases comprises generating paraphrase pairs.

In another aspect of the presently described embodiments, the generating paraphrases comprises generating paraphrases in a many-to-one mapping of paraphrases.

In another aspect of the presently described embodiments, the system comprises an input for raw text, a processor operative to break the raw text into individual sentences, provide the individual sentences to an annotating source to conduct a survey based on the individual sentences, receive results of the survey, filter the results, provide the filtered results to the annotating source to conduct a second survey, receive results of the second survey, and generate paraphrases based on the results of the second survey, and an output for the paraphrases.

In another aspect of the presently described embodiments, the system further comprises a database for the raw text.

In another aspect of the presently described embodiments, the processor comprises a computing script to provide the individual sentence to the annotating device.

In another aspect of the presently described embodiments, the processor comprises a computing script to filter the results of the survey.

In another aspect of the presently described embodiments, the processer comprises a computing script to provide the filtered results to the annotating source.

In another aspect of the presently described embodiments, the processor is operative to generate paraphrase pairs.

In another aspect of the presently described embodiments, the processor is operative to generate paraphrases on a many-to-one mapping basis.

In another aspect of the presently described embodiments, the annotating source comprises a survey platform.

In another aspect of the presently described embodiments, the system comprises means for receiving raw text as input, means for sentence breaking the raw text into individual sentences, means for providing the individual sentences and a corresponding survey to an annotating source, wherein the annotating source conducts the survey based on the individual sentences, means for receiving results of the survey from the annotating source, means for filtering the survey results, means for providing the filtered survey results and a second survey to the annotating source, wherein the annotating source conducts the second survey based on the filtered results, means for receiving results of the second survey from the annotating source, and means for generating paraphrases based on the results of the second survey.

BRIEF DESCRIPTION OF THE DRAWINGS

FIG. 1 is an example of a survey according to the presently described embodiments;

DETAILED DESCRIPTION

Figure 2:
FIG. 2 is an example of a survey according to the presently described embodiments.

The presently described embodiments relate to automatic paraphrase acquisition. A common theme of the various embodiments described herein resides in careful design of simple tasks that can elicit the necessary information for the automated process. In at least one form, these tasks are performed quickly and inexpensively by untrained non-expert workers or survey respondents. By gathering, filtering and/or analyzing the results produced by the workers or respondents, paraphrases can be generated automatically to achieve the objectives of the presently described embodiments.

The presently described embodiments address the problems noted above. The approach is exemplified by an application case in the domain of sentiment analysis. However, this approach can also be applied to other application domains such as question answering, searching, information extraction and information retrieval.

Briefly, current research on paraphrase acquisition focuses on recognizing any arbitrary pairs of paraphrases. The output of such systems is represented as follows.

Expression A=Expression B
Expression B=Expression C
Expression C=Expression D

However, for real world NLP applications, such as question answering, searching etc., the presently described embodiments recognize that the more desired paraphrase format is multiple-to-one mapping such as the following.

Expression B=Expression A
Expression C=Expression A
Expression D=Expression A

In the above format, 'Expression A' is the chosen standard expression and serves as the key for extracting and retrieving data.

Based on this stipulation, the approach according to the presently described embodiments aims to automatically generate paraphrases in the above format. Careful design of simple tasks that can elicit the necessary information for this automated process of paraphrase generation. Selected tasks can be performed quickly and inexpensively by untrained non-expert workers or respondents, such as the ones on the Amazon Mechanical Turk platform or any other automated survey platform. It should be appreciated that any suitable source to provide results and, thus, annotate the sentences will suffice. For example, in the absence of a suitable survey platform, one may wish to hire workers to provide survey results to annotate the sentences. In any event, by gathering the results produced by the workers or respondents, paraphrases are generated automatically by the presently described embodiments. To illustrate how this goal is achieved, an example for sentiment analysis is described below.

In the domain of sentiment analysis, it is important to identify various ways of expressing the same opinion. For example, all of the following sentences indicate the same opinion of 'The construction quality of the camera is bad.'

(1) One thing I have to mention is that the battery door keeps falling off.

(2) On my recent trip to California, I dropped my camera and it broke into two parts.

(3) I have to say the build of this camera is rather disappointing.

To generate paraphrases for 'The construction quality of the camera is bad' from (1)-(3), the following two types of information are used. First, whether or not the sentence expresses a negative opinion regarding the construction quality of the camera is assessed. Second, the exact portion of the sentence that indicates that opinion is determined. To obtain such information, surveys may be designed and used. Such surveys may be given to a sampling of people, as described above, to complete the surveys to generate data or results. Thus, the respondents to the surveys are providing annotations to the text.

With reference to FIG. 1, Survey 1 (shown at 100) asks the workers to judge whether a sentence (e.g. sentences (1), (2) or (3)) indicates an opinion towards a certain feature of the camera, and if so, whether the opinion is positive, negative or neutral. As noted, a well-designed survey at this stage allows the system to begin to determine paraphrases for statements such as, "The construction quality of the camera is bad." For example, the example annotations for sentences (1)-(3) are shown in FIG. 1. As can be seen, the survey 100 includes a Feature Name field 102, and various response fields such as Not Invoked field 104, Positive field 106, Negative field 108 and Neutral field 110. The survey respondents are prompted and able to select one of the response fields for each feature, In the example shown, a negative response is provided for the feature Construction Quality for the sentences, So, sentences (1)-(3) (or at least parts thereof) are, thus far in the processing, candidates to be paraphrases for the statement, "The construction quality of the camera is bad." In the same survey, the respondent selected Not Invoked for the features Picture Quality and Battery Life, in view of the same sentences . Therefore, for Picture Quality or Battery Life statements, sentences (1)-(3) are not likely to be or include suitable paraphrases, at least based on this data.

In an experiment, 2000 sentences were randomly selected from a database of camera reviews. Each sentence was annotated by two online workers separately. 855 gold-standard annotations were obtained. Each annotation comprised a sentence labeled with a feature and a sentiment toward that feature. An annotation was considered "gold" when both annotators marked the same sentiment toward the same feature. Subsequently, these 855 sentences were then used in Survey 2, as described below.

With reference to FIG. 2, Survey 2 (shown at 200) asks the workers to point out the exact portion of the sentence that indicates an opinion. The opinion and its associated feature name are displayed along with the sentence in which they appear. Such information is automatically generated from the results derived from Survey 1.

The expected answer for this example is 'I dropped my camera and it broke into two parts.' Or simply 'my camera broke into two parts.'

Based on these two results:

1. Given that by now we already know that the sentence 'On my recent trip to California, I dropped my camera and it broke into two parts.' expresses a Negative opinion toward the feature Construction Quality; and 2. the exact portion of the sentence to indicate that opinion is 'my camera broke into two parts,' we can automatically generate the following paraphrase pair:

My camera broke into two parts.=The construction quality of the camera is bad.

As noted, using this method, we automatically generated 855 paraphrase pairs for the original 2000 sentences. An initial investigation shows that about 87% of the generated paraphrases are valid. This approach delivers high accuracy for low cost. We acquired the results in a short time, e.g. a few days, with a minimal total cost, including fees paid to the annotation sources. Using this approach, the desired many-to-one mapping of paraphrases can be achieved. For example, many paraphrases (such as selected parts of (1) to (3) above) are mapped to the statement, "The construction quality of the camera is bad."

We further tested the quality and effectiveness of the acquired paraphrases by using them as our training data to perform a sentence level sentiment extraction. The goal is to extract camera features and their associated polarity values from the sentences. Our initial experiment gives results that are comparable to state-of-art systems. Furthermore, we compared the results from training on the acquired paraphrases with the results from training on the original sentences from which the paraphrases were derived and found that the former outperforms the latter, which suggests that the paraphrases are indeed helpful for this sentiment extraction task.

Figure 3:
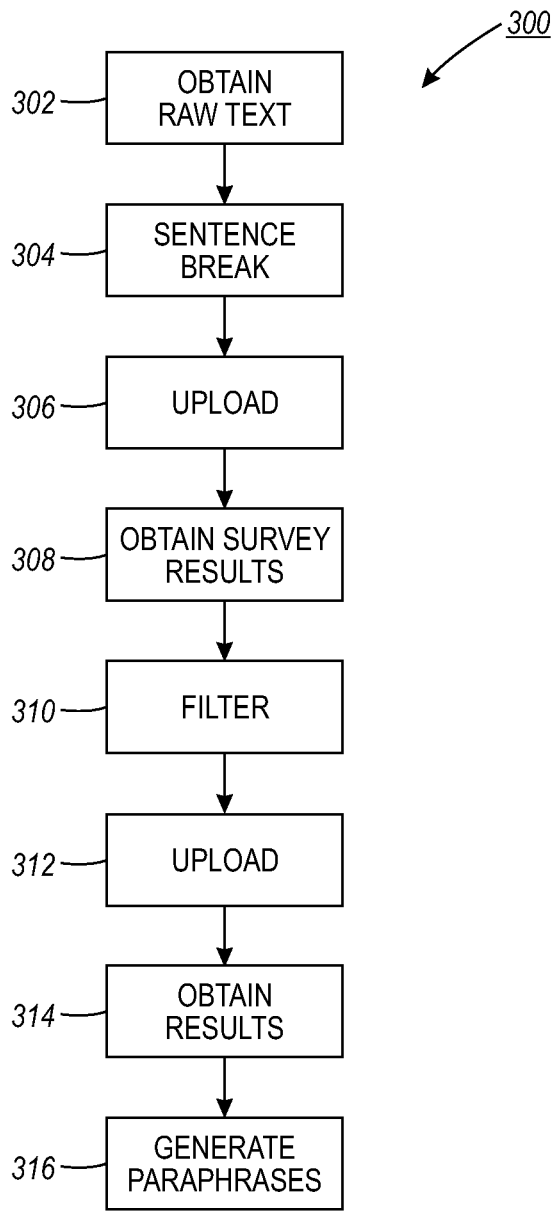
FIG. 3 is an illustration of a method according to the presently described embodiments.

With reference to FIG. 3, a method 300 according to the presently described embodiments is illustrated. It should be appreciated that the method 300 may be implemented in a variety manners including the implementation of various software techniques and hardware configurations. One such implementation will be described in connection with FIG. 4. However, it should be appreciated that a variety of such configurations are contemplated by the presently described embodiments.

With reference back now to FIG. 3, the method 300 includes first obtaining raw text or corpora (at 302). It should be appreciated that the raw text can be obtained by the contemplated system from a variety of sources including suitable databases. Next, the raw text is broken up into, for example, individual sentences using, for example, a sentence breaking routine (at 304). It should be appreciated that the parsing or breaking of the text into sentences, or other units such as paragraphs, phrases, words or groups of words, can be accomplished using a variety of techniques familiar to those in the field. However, in at least one form, this procedure is accomplished on an automated basis by suitable processors.

The individual sentences are then provided or uploaded to an annotating source for processing (at 306). It will be understood that this processing includes the completion of surveys as described above. The surveys are also uploaded to the annotating source. Next, the results of the survey are obtained and/or downloaded to a suitable system (at 308). In some cases, the results are filtered to prepare for further stages of annotation (at 310). It should be further understood that the filtered results are then provided or uploaded to the annotating source (e.g. in a first stage or stage 1 of the process) (at 312) and used in a second survey (which is also uploaded) in manners similar to those described above (e.g. in a second stage or stage 2 of the process). The results are obtained and downloaded (at 314). The results of the second survey can then be used to generate paraphrases and/or paraphrase pairs as described above (at 316). Of course, further stages, e.g. up to stage n, may be added to the process.

As noted above, it should be appreciated that the pruning of non-informative phrases as discussed by way of example above (e.g. in connection with FIG. 2), allows for the system to then more effectively acquire more accurate paraphrases and enhance the process. In this way, many-to-one mappings of paraphrases that have non-informative information (such as the phrase "On my recent trip to California," in the example above) pruned out can be accomplished according to the presently described embodiments.

Figure 4:
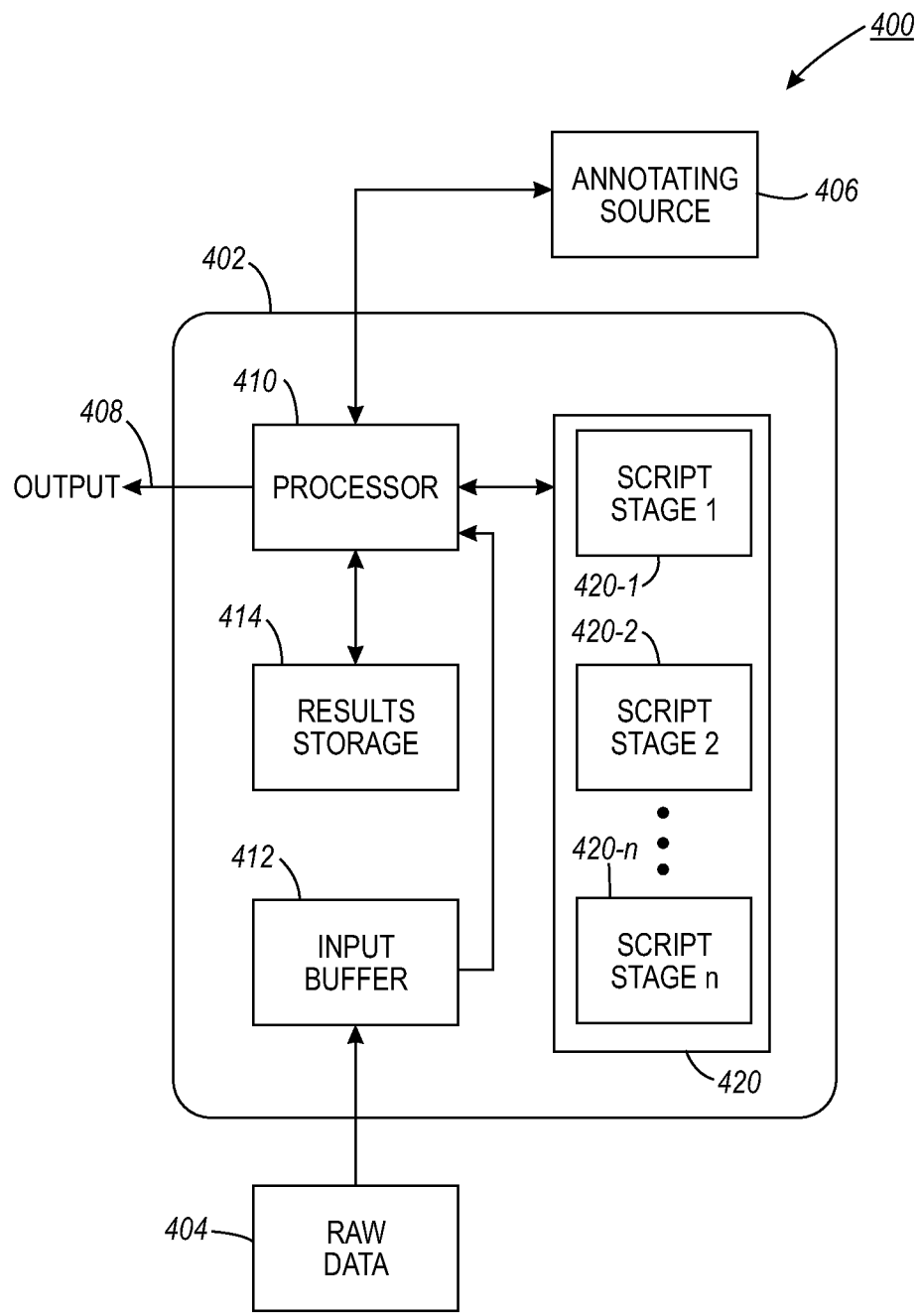
FIG. 4 is an illustration of a system according to the presently described embodiments.

With reference now to FIG. 4, a system implementation of the presently described embodiments is illustrated. As noted above, the system may be configured in a variety of manners; however, any such system will be efficiently designed to prune non-informative phrases from sentences to achieve the goals of the presently described embodiments.

As shown, a system 400 includes the processing module 402, input raw data source 404, an annotating source 406 and an output 408. The processing module 402 further includes a micro-processor 410, a raw data buffer 412 and a results storage device 414. Also shown within the processing module 402 are computing scripts used for various stages in the process (at 420). More particularly, computing script modules for stages 420-1, 420-2, . . . 420-n are shown. Again, the processing module 402 may be implemented using a variety of software techniques and hardware configurations. The system shown is merely representative and exemplary in nature.

Raw data source 404 may likewise take a variety of forms. Raw data source 404 may comprise a database, or other server device that will provide sufficient text or corpora to the system for training purposes.

The annotating source 406 also may take a variety of forms. In one form, workers on the Amazon Mechanical Turk platform are used as the annotating source 406. However, as noted above, it should be appreciated that any source of survey results will suffice.

In operation, the micro-processor 410 uploads the raw data from the raw data source 404 through, in one form, the input buffer 412, to the annotating source 406 based on the script module for stage 1 of the process. It should be understood that the raw data, in at least one form, is broken up into individual sentences (or other units) as described above (e.g. before or during uploading to the annotating source) by the micro-processor 410 or other suitable processor. The annotating source provides results (e.g. survey results obtained from respondents to Survey 1) to the micro-processor which stores the results in a storage, such as results storage 414. The results from Survey 1 are filtered and uploaded for stage 2 of processing by the micro-processor 410 based on the script for stage 2. In this regard, the micro-processor 410 provides the selected results and Survey 2 to the annotating source to obtain results from stage 2 (e.g. results from Survey 2). Once the results for the second stage are obtained, the paraphrases or paraphrase pairs may be obtained, or further stages may be implemented. Also, it should be appreciated that the uploading and downloading may be initiated and/or accomplished manually or automatically.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for acquiring paraphrases for use in natural language processing applications, the method being conducted using an automated survey platform that is configured to permit access to a group of crowd-workers for performing portions of a task while other portions are performed by the automated survey platform, and using a processor configured to perform the method, the method comprising:
receiving raw text as input to the processor, the raw text being a result of obtaining opinions of a group of consumers or customers of a product or service;
sentence breaking the raw text into individual sentences by the processor by use of automatic natural language processing techniques;
providing the individual sentences and a first survey by the processor through the automated survey platform to a plurality of annotating sources,
wherein each annotating source reviews the individual sentences and determines an assessment of the individual sentences based on the first survey, and
wherein the automated survey platform is accessed by the plurality of annotating sources for the first survey, the plurality of annotating sources for the first survey being crowd-workers connected via their respective networked computers over the internet with the automated survey platform;
receiving results of the first survey from the each of the annotating sources for the first survey by the processor;
filtering the results of the first survey by the processor to group the individual sentences that were the subject of the first survey into groups that have received like assessments from the annotating sources;
providing the filtered survey results and a second survey by the processor to a plurality of annotating sources for the second survey, the plurality of annotating sources for the second survey being crowd-workers connected via their respective networked computers over the internet with the automated survey platform,
wherein each annotating source for the second survey conducts the second survey based on the filtered results to determine portions of the individual sentences included in the filtered results that indicate the assessment, and wherein the plurality of annotating sources for the first survey and the plurality of annotating sources for the second survey each comprises a sampling of people to complete the first survey and the second survey, respectively, and wherein the sampling of people comprises respondents to the automated survey platform;

receiving results of the second survey from the plurality of annotating sources for the second survey by the processor; and automatically generating by the processor paraphrases based on the results of the second survey, wherein the paraphrases are pairs of expression that have a same meaning.

2. The method as set forth in claim 1 wherein the raw text is provided by a database.

3. The method as set forth in claim 1 wherein the providing of the individual sentences and a survey is based on a script.

4. The method as set forth in claim 1 wherein the filtering is based on a script.

5. The method as set forth in claim 1 wherein the providing of the filtered survey results and the second survey is based on a script.

6. The method as set forth in claim 1 wherein the generating paraphrases comprises generating paraphrases in a many-to-one mapping of paraphrases.

7. The method as set forth in claim 1 wherein the first survey and the second survey are based on sentiment analysis.

8. A system for acquiring paraphrases for use in natural language processing applications, the system including an automated survey platform that is configured to permit access to a group of crowd-workers for performing portions of a task while other portions are performed by the automated survey platform, the system comprising:

an input interface for raw text, the raw text being a result of obtaining opinions of a group of consumers or customers of a product or service;

a processor configured to break the raw text into individual sentences by use of automatic natural language processing techniques, provide the individual sentences and a first survey through the automated survey platform to a plurality of annotating sources, wherein each annotating source reviews the individual sentences and determines an assessment of the individual sentences based on the first survey, and wherein the automated survey platform is accessed by the plurality of annotating sources for the first survey, the plurality of annotating sources for the first survey being crowd-workers connected via their respective networked computers over the internet with the automated survey platform;

receive results of the first survey from the each of the annotating sources for the first survey, filter the results of the first survey to group the individual sentences that were the subject of the first survey into groups that have received like assessments from the annotating sources, provide the filtered survey results and a second survey to a plurality of annotating sources for the second survey to conduct the second survey to determine portions of the individual sentences included in the filtered survey results that indicate the assessment, the plurality of annotating sources for the second survey being crowd-workers connected via their respective networked computers over the internet with the automated survey platform, receive results of the second survey from the plurality of annotating sources for the second survey, and automatically generate paraphrases based on the results of the second survey, wherein the plurality of annotating sources for the first survey and the plurality of annotating sources for the second survey each comprises a sampling of people to complete the first survey and the second survey, respectively, and wherein the sampling of people comprises respondents to the automated survey platform; and an output interface for the paraphrases, wherein the paraphrases are pairs of expression that have a same meaning.

9. The system as set forth in claim 8 further comprising a database for the raw text.

10. The system as set forth in claim 8 wherein the processor comprises a script to provide the individual sentence to the annotating source.

11. The system as set forth in claim 8 wherein the processor comprises a script to filter the results of the survey.

12. The system as set forth in claim 8 wherein the processer comprises a script to provide the filtered results to the annotating source.

13. The system as set forth in claim 8 wherein the processor is operative to generate paraphrases on a many-to-one mapping basis.

14. The system as set forth in claim 8 wherein the first survey and the second survey are based on sentiment analysis.

15. A system for acquiring paraphrases for use in natural language processing applications, the system including an automated survey platform that is configured to permit access to a group of crowd-workers for performing portions of a task while other portions are performed by the automated survey platform, the system comprising:

means for receiving raw text as input, the raw text being a result of obtaining opinions of a group of consumers or customers of a product or service;

means for sentence breaking the raw text into individual sentences by use of automatic natural language processing techniques;

means for providing the individual sentences and a first survey through the automated survey platform to a plurality of annotating sources, wherein each annotating source reviews the individual sentences and determines an assessment of the individual sentences based on the first survey, and wherein the automated survey platform is accessed by the plurality of annotating sources for the first survey, the plurality of annotating sources for the first survey being crowd-workers connected via their respective networked computers over the internet with the automated survey platform;

means for receiving results of the first survey from each of the annotating sources for the first survey;

means for filtering the results of the first survey to group the individual sentences that were the subject of the first survey into groups that have received like assessments from the annotating sources;

means for providing the filtered results of the first survey and a second survey to a plurality of annotating sources for the second survey, to determine portions of the individual sentences included in the filtered results of the first survey that indicate the assessment, the plurality of annotating sources for the second survey being crowd-workers connected via their respective networked computers over the internet with the automated survey platform means for receiving results of the second survey from the plurality of annotating sources for the second survey;

means for automatically generating paraphrases based on the results of the second survey, wherein the plurality of annotating sources for the first survey and the plurality of annotating sources for the second survey each comprises a sampling of people to complete the first survey and the second survey, respectively, and wherein the sampling of people comprises respondents to the automated survey platform; and means for output of the paraphrases, wherein the paraphrases are pairs of expression that have a same meaning.

16. The system as set forth in claim 15 wherein the first survey and the second survey are based on sentiment analysis.

* * * * *